Figure 1:
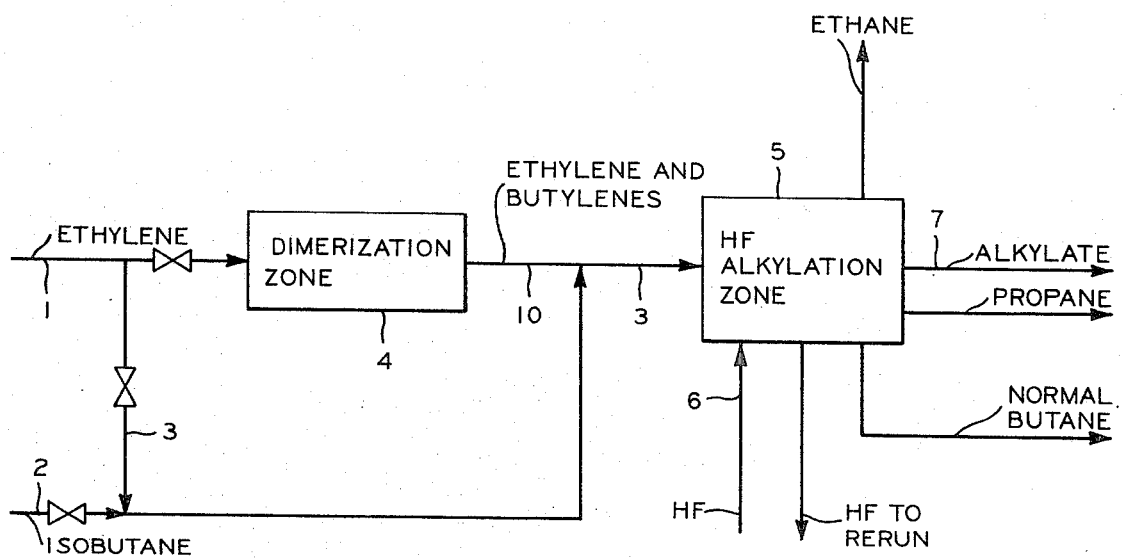

United States Patent [19]

Hutson, Jr. et al.

[11] 3,761,540
[45] Sept. 25, 1973

[54] ALKYLATION OF ISOPARAFFIN WITH ETHYLENE AND A HIGHER OLEFIN

[75] Inventors: Thomas Hutson, Jr.; Cecil O. Carter, both of Bartlesville, Okla.

[73] Assignee: Phillips Petroleum Company, Bartlesville, Okla.

[22] Filed: Apr. 30, 1971

[21] Appl. No.: 138,991

Related U.S. Application Data

[63] Continuation-in-part of Ser. No. 79,405, Oct. 12, 1970, abandoned.

[52] U.S. Cl. .................... 260/683.51, 260/683.48
[51] Int. Cl. ............................................. C07c 3/54
[58] Field of Search .............. 260/683.48, 683.49, 260/683.51, 683.52, 683.41, 683.42

[56] References Cited
UNITED STATES PATENTS

| | | | |
|---|---|---|---|
| 2,387,162 | 10/1945 | Matuszak | 260/683.48 |
| 2,382,899 | 8/1945 | Newman | 260/683.48 |
| 2,322,800 | 6/1943 | Frey | 260/683.48 |
| 2,539,668 | 1/1951 | Linn et al. | 260/683.48 |
| 2,451,843 | 10/1948 | Linn et al. | 260/683.48 |
| 3,435,092 | 3/1969 | Hutson, Jr. et al. | 260/683.48 |
| 3,213,157 | 10/1965 | Hays et al. | 260/683.48 |
| 2,394,929 | 2/1946 | Matuszak | 260/683.41 |
| 2,399,353 | 4/1946 | Jones | 260/683.51 |
| 2,455,003 | 11/1948 | Frey | 260/683.41 |
| 2,472,908 | 6/1949 | Linn | 260/683.42 |
| 3,246,047 | 4/1966 | Chapman et al. | 260/683.48 |

FOREIGN PATENTS OR APPLICATIONS 654,625 12/1962 Canada .................. 260/683.48

*Primary Examiner*—Delbert E. Gantz
*Assistant Examiner*—G. J. Crasanakis
*Attorney*—Young and Quigg

[57] ABSTRACT

An isoparaffin, e.g., isobutane and/or isopentane are alkylated with ethylene in presence of a higher olefin, e.g., propylene, a butylene, etc., using hydrogen fluoride catalyst to produce high octane value alkylate with little or no or some formation of ethyl fluoride. Alkylate of 97 plus, TEL-free, Research Octane can be produced from isobutane, propylene and ethylene. Alkylate of one hundred Research Octane with no tetraethyl lead can be produced with approximately equal parts by weight of ethylene and isobutylene in an alkylation of isobutane, in presence of virtually anhydrous HF catalyst at a temperature of the order of about 75° F., and a catalyst to total hydrocarbon ratio of about four. At isobutane to total olefin (ethylene plus higher olefin) mol ratio of less than about four to one, a small proportion of $BF_3$ is required in the HF catalyst to produce alkylate in practical quantities of sufficiently high Research Octane (clear) and with minimized production of ethyl fluoride.

12 Claims, 4 Drawing Figures

ALKYLATION OF ISOPARAFFIN WITH ETHYLENE AND A HIGHER OLEFIN

This application is a continuation-in-part of Ser. No. 79,405 filed Oct. 12, 1970, now abandoned.

This invention relates to alkylation of hydrocarbons. In one of its aspects it relates to the alkylation of an isoparaffin with an olefin. More particularly the invention relates to the alkylation of an isoparaffin with ethylene.

In one of its concepts, the invention provides a process for the production of high octane value alkylate from ethylene and an isoparaffin by alkylating these hydrocarbons in the presence of hydrogen fluoride catalyst there being present during the alkylation reaction a substantial proportion of a higher olefin, e.g., propylene and/or a butylene. In another of its concepts, the invention provides a process as described with production of little or zero ethyl fluoride wherein the weight ratio of the ethylene to the higher olefin is of the order of about one. Further, in another of its concepts, the invention provides a process as described in which the weight percent of olefin higher than ethylene in the total olefin employed used in the alkylation will be of the order of about from about 5 to about 70 weight percent, preferably from about 5 to about 65 weight percent, and still more preferably from say 10 to 50–55 weight percent, depending upon the particular higher olefin selected and upon other variables in the process, as one skilled in the art having studied this disclosure can determine by routine testing. A further concept of the invention provides a process for the alkylation of isoparaffin with the olefins wherein the hydrogen fluoride catalyst has very little or no water content, i.e., is virtually anhydrous and will contain preferably less than of the order of about 3 percent water by weight based on the total catalyst. In a further concept still, the invention provides for the use of hydrogen fluoride catalyst entirely free from boron trifluoride for obtaining high yields of high octane alkylate when operating with an isobutane to total olefin mol ratio of greater than about four to one. In further concept, the invention provides a process for alkylation, as described, wherein the ratio of isoparaffin to total olefin mol ratio is less than about four to one, usually in the range 1.5/1 up to about 4/1 and wherein there is present advantageously in the hydrogen fluoride catalyst from about 0.3 to about 4 weight percent of $BF_3$.

PRIOR ART

U.S. Pat. No. 2,322,800, issued June 29, 1943, to F. E. Frey, indicates that in HF alkylation ethylene enters into reaction least readily of the olefins, especially in the absence of olefins of more carbon atoms per molecule.

U.S. Pat. No. 2,387,162, issued Oct. 16, 1945, to M. P. Matuszak, recognizes that $BF_3$ is needed in HF catalyst to alkylate isoparaffin with ethylene.

Other information on HF alkylation can be had in Hydrofluoric Acid Alkylation, a Phillips Petroleum Company publication, Copyright 1946, Phillips Petroleum Company, Bartlesville, Oklahoma.

THE INVENTION

We have now found it to be very advantageous to use, say, propylene and/or isobutylene to promote the alkylation of ethylene and isobutane in an HF acid catalyst system. We have found that we can alkylate with ethylene and with propylene at mol ratios of isoparaffin to total olefin in excess of about 6/1 employing a hydrogen fluoride catalyst containing no $BF_3$ at all yet making a high octane alkylate which is suitable for lead-free fuel use. We have found also that when an approximate minimum of 20 weight percent of isobutylene is present in the ethylene-isobutylene mixture the formation of ethyl fluoride will be minimized. Runs have been made in which zero ethyl fluoride has been detected. Further, we have found that the alkylate product is higher in quality than that produced from the alkylation of isobutylene alone and only slightly lower in quality than that produced from the alkylation of ethylene using such as aluminum chloride type catalyst system to produce "diisopropyl." Pilot plant data show the following Research Octane Numbers: HF alkylate produced from isobutane and isobutylene — 108.8 (with 3 cc TEL), and 94.8 (clear of TEL-free); alkylate (diisopropyl) produced from isobutane and ethylene using $AlCl_3$-complex catalyst — about 114.9 (with 3 cc TEL), and 100.6 (clear); and alkylate produced using HF as catalyst, isobutane, and 33 weight percent isobutylene and 67 weight percent ethylene (the percents based on total olefin isobutylene-ethylene) — 113.8 (with 3 cc TEL), and 99.5 (clear). Clear ratings of well above 90 to 100 inclusive have been obtained without detecting ethyl fluoride formation when using approximately equal parts by weight of ethylene and isobutylene as summarized in the data given herein.

We have found that when isobutane was alkylated with ethylene and isobutylene, the isobutylene being present in an amount of about 10 weight percent of the total ethylene plus isobutylene, in the liquid phase, at about 100° F., using as catalyst hydrogen fluoride containing as little as about 0.36 weight percent boron trifluoride, that approximately 40 weight percent of the ethylene was converted to ethyl fluoride, and about 55 weight percent of the ethylene was converted to aklylate. This alkylate ($C_5$ and heavier) had a Research Octane Number, lead free of clear, of 100.4. In this operation, high octane alkylate was produced; however, almost 40 percent of the ethylene was converted to ethyl fluoride, requiring further processing of this large amount of material to additional aklylate. We have also found that isoparaffin, e.g., isobutane, can be alkylated with ethylene and propylene to yield a high octane, RON 97+, alkylate over a wide range of proportions of ethylene to propylene in the olefin feed. The data herein show such alkylates produced with about 1/3 ethylene and 2/3 propylene and vice versa. It appears that the propylene can be 10 to 90 weight percent of total ethylene plus propylene. It was not obvious from the prior art that at below about 4 to 1 mol ratio of isoparaffin to total olefin, wherein ethylene is at least one of the olefins and there is present a higher olefin, that if the HF catalyst has therein a small proportion of $BF_3$ up to about 4 weight percent $BF_3$ high octane alkylate can be produced and that a relatively low ethyl fluoride per pass yield can be obtained. Also, the prior art did not realize that the presence of an olefin higher than ethylene, when operating at below about 4 to 1 mol ratio of isoparaffin to total olefin would permit obtaining a yield of high quality alkylate and relatively low ethyl fluoride production.

It is an object of this invention to provide a process for the alkylation of an isoparaffin with an olefin. It is another object of this invention to provide for the alkylation of an isoparaffin with an olefin to produce a high octane value alkylate product using ethylene as an alkylating agent in the presence of hydrogen fluoride. It is another object of this invention to produce a high octane value isoparaffin-ethylene alkylate employing hydrogen fluoride as a catalyst yet minimizing the production of ethyl fluoride. A further object of the invention is to provide a process for the alkylation of an isoparaffin such as isobutane and/or isopentane with ethylene and a higher olefin, e.g., propylene, a butylene, a pentene or a hexene in the presence of hydrogen fluoride with production of zero or relatively little ethyl fluoride yet to obtain high Research Octane, clear ratings, i.e., to obtain a debutanized alkylate useful for the production of lead-free or substantially lead-free motor fuels. Still another object of this invention is to provide for the alkylation of an isoparaffin, say, isobutane and/or isopentane, with an olefin mixture containing a substantial amount of ethylene but also containing a higher olefin, e.g., propylene, a butylene, etc., under conditions to obtain a high octane alkylate suitable for lead-free fuel use there being employed a hydrogen fluoride catalyst not containing any boron trifluoride. It is a still further object of this invention to provide an alkylation as herein described wherein at temperatures of from about 75° to about 150° F., preferably 75° to about 130° F., or so, ethyl fluoride formation will be virtually zero.

Other aspects, concepts and objects of the invention are apparent from a study of this disclosure, the drawing and the appended claims.

According to the present invention, there is provided a process for alkylation of an isoparaffin with ethylene in the presence of a higher olefin with intimate contact of the reactants in the presence of a hydrogen fluoride catalyst thereby producing a high octane alkylate suitable for lead-free fuel use.

Generally, according to the invention, the ethylene and the higher olefin will each be present in a substantial amount as herein set forth and the catalyst will contain zero to about 4 weight percent $BF_3$ depending upon other factors.

Generally still, according to the invention, usually, the mol ratio of isoparaffin to total olefin will be in the overall range of from about 1.5 to 1 to about 20–25 to 1, or higher and the weight of the higher olefin will be above about 5 weight percent of the total olefin.

More specifically, now it is preferred to operate in the absence of $BF_3$ for reasons one skilled in the art of alkylation can appreciate.

According to the present invention, we can operate with no $BF_3$ in the catalyst when the mol ratio of isoparaffin to total olefin will be usually in the approximate range of from about 4/1, preferably about 6/1 to about 25/1 or higher.

Further, still according to the invention at lower ratios of isoparaffin to olefin in the reaction zone, say at mol ratios of less than about 4/1, which can be as low as about 1.5/1, there still can be made a high octane value alkylate by adding to the HF catalyst more $BF_3$, usually from about 0.3 to about 3–4 percent based upon the total weight of the catalyst in the reaction zone under on stream operating conditions, including recycle of catalyst and/or any alkyl fluoride which has been produced, ordinarily more than about 4 weight percent $BF_3$ in the catalyst will not be used.

Figure 2:
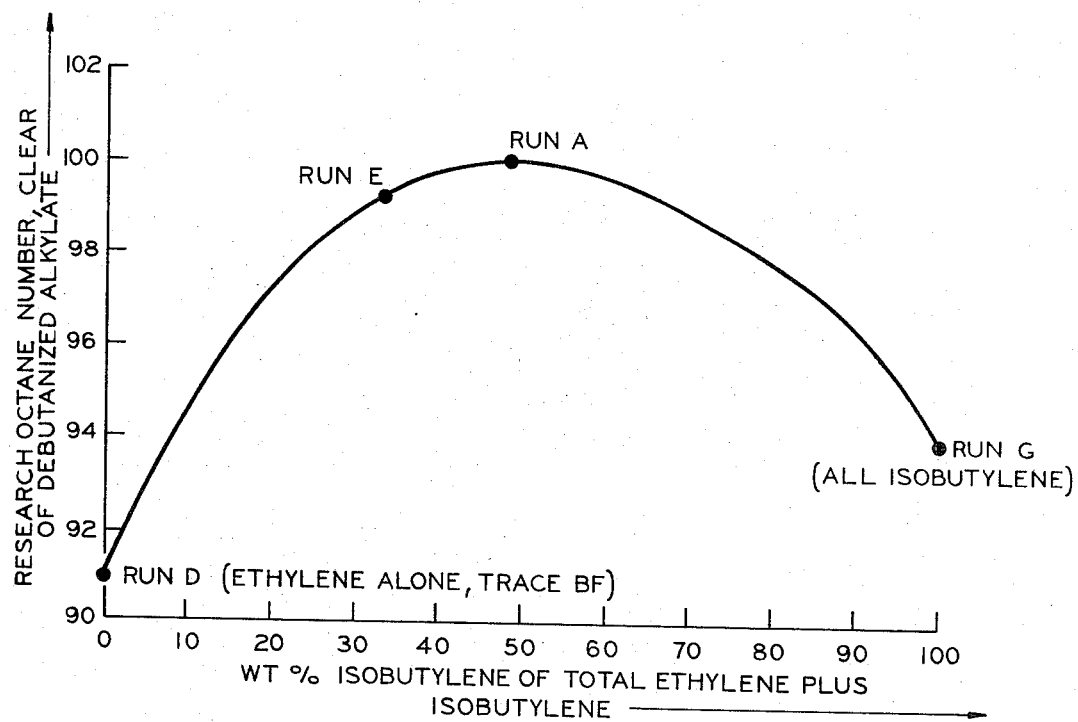
Figure 3:
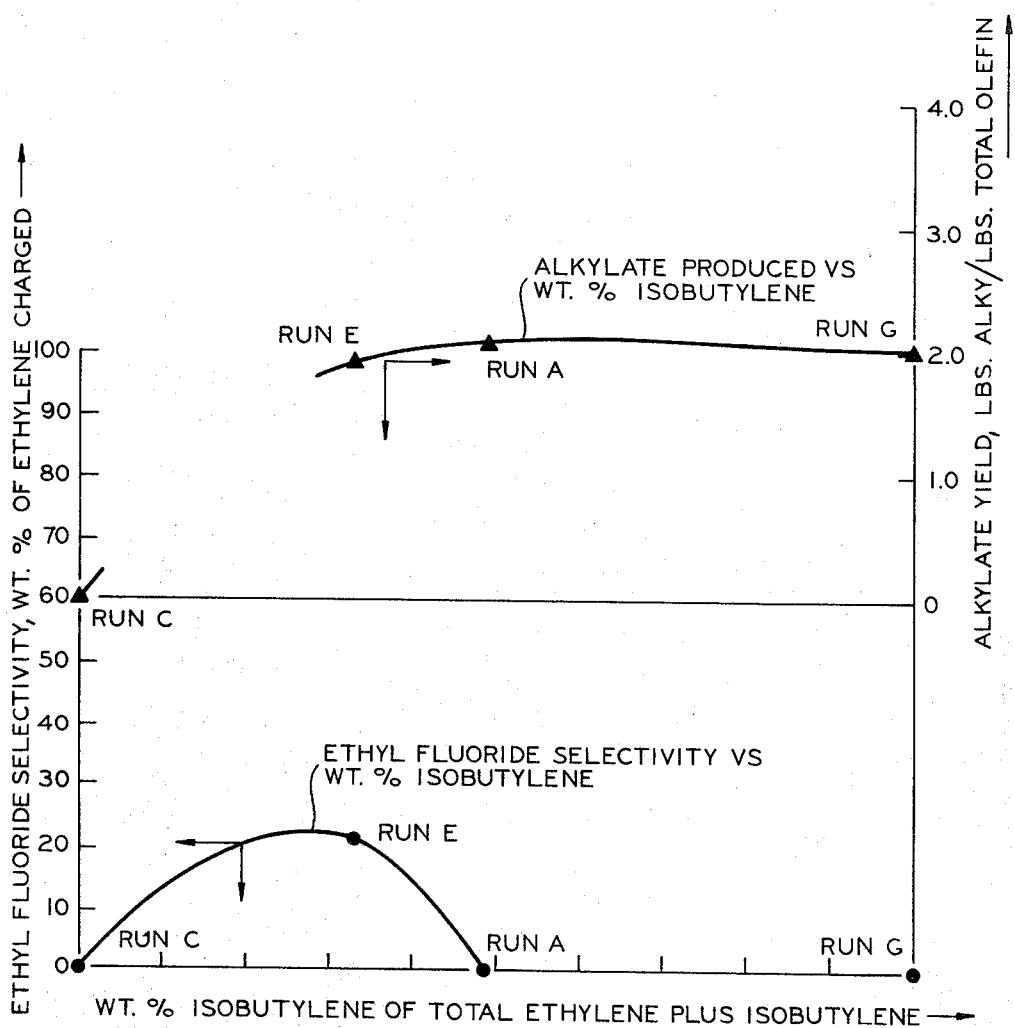
Figure 4:
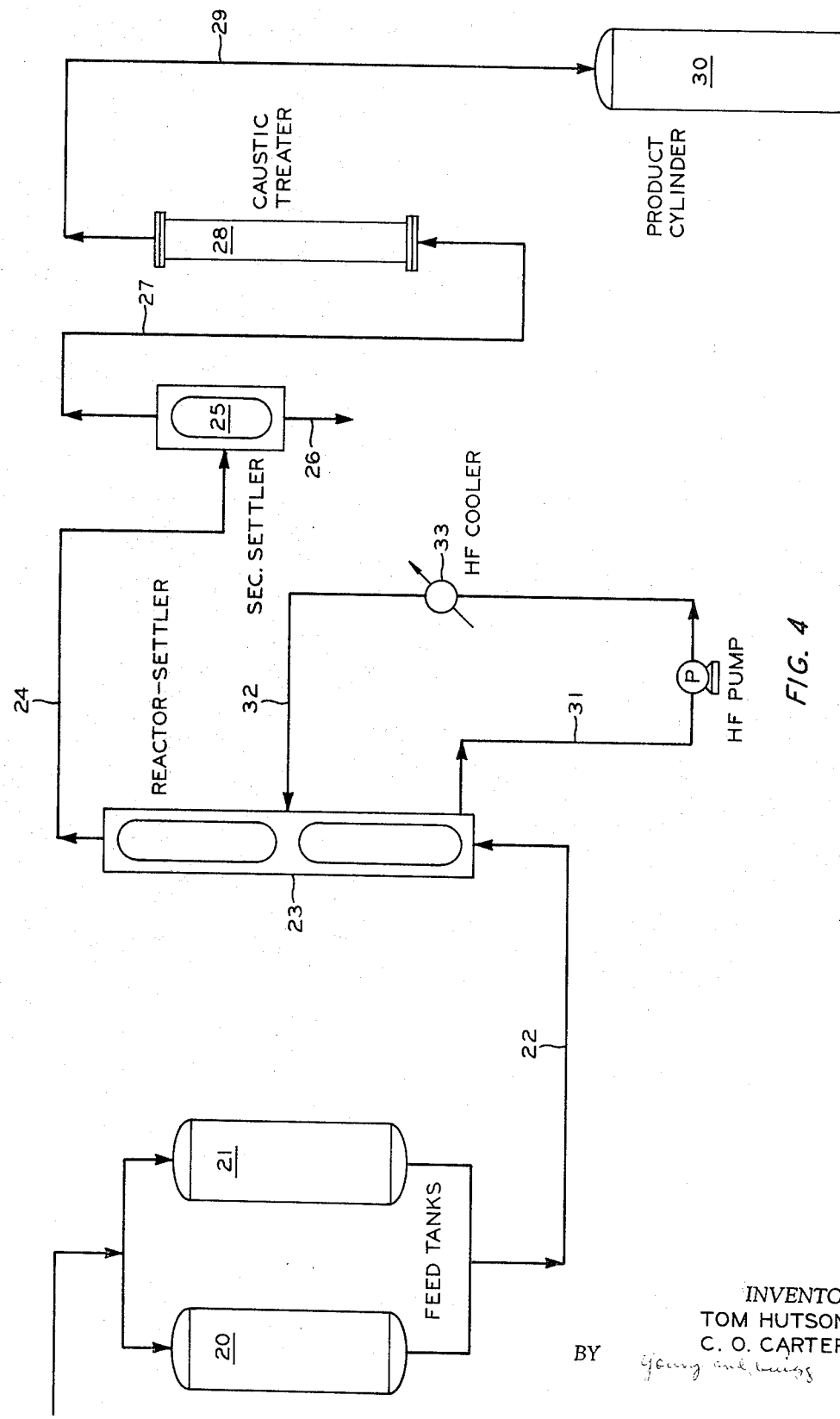

Referring now to the drawings, FIG. 1 shows in diagrammatic form an operation according to the invention. FIG. 2 shows a plot of runs from the data given in Example I herein and illustrates the high octane number obtained when the isobutylene in the total olefin is in the preferred ranges given herein. FIG. 3 is also based on data given in Example I herein. The lower curve which should be read in conjunction with the left hand ordinate illustrates the formation of ethyl fluoride versus isobutylene content of the total olefin. The upper line illustrates alkylate yield and should be read in conjunction with the right hand ordinate. FIG. 4 shows the Pilot Plant system used to obtain data for Examples I, II and III.

Referring now to FIG. 1, ethylene and isobutane are introduced at 1 and 2 respectively. A sufficient portion of ethylene is passed by 3 into admixture with the isobutane in 2 so as to provide a desired ratio of ethylene to isobutane at the juncture of 2 with transfer line 3. The remainder of the ethylene is passed by 1 into dimerization zone 4 wherein the ethylene is dimerized essentially to butylenes recovered at 10. The butylenes are admixed in 3 with the isobutane and ethylene and the final admixture passed to HF alkylation zone 5 to which hydrogen fluoride catalyst is passed by 6. After thorough and intimate admixture of the catalyst, the isoparaffin and the olefins in zone 5, separation by usual methods takes place and a high octane value alkylate is removed from the operation at 7.

Referring now to FIG. 4, hydrocarbon feed, ethylene and/or propylene, (isobutylene) and isobutane from tank 20 and/or 21 is passed via conduit 22 to reactor-settler 23 containing the alkylation catalyst. The hydrocarbon mixture is dispersed via nozzle (not shown) into the liquid catalyst wherein alkylate is produced. Product accumulates above the catalyst in the settler and is passed via 24 to a secondary settler 25. Catalyst is recovered via 26. Product from 25 passes via 27 to caustic treater 28 and the caustic-treated product passes via 29 to accumulator or product cylinder 30. Catalyst is cycled via 31 cooler 33 and via 32 to the reactor 23.

In the operation described the charge ethylene can contain ethane. However, since separation problems to recover HF may be involved, it is now preferred to have little or no ethane in the ethylene feed.

Propylene and butylenes are preferred as the higher olefin to be present during the ethylene-isoparaffin alkylation. Particularly, propylene, butene-2 and isobutene are preferred. Mixtures of butylenes can also be used. Further, a pentene or pentenes, and a hexene or hexenes, can also be used. Mixtures of any of these higher olefins can be used. Of propylene and butylenes, propylene is now preferred for plant practicality reasons. As evident herein, and from the data, these higher olefins, i.e., propylene and butylene, are very acceptable higher olefins.

In one process, according to the invention, about 80 percent ethylene and 20 percent mixed butenes are used as an olefin feed. Ethyl fluoride formed is recycled to the reactor and acts as an olefin there. A 5/1 ratio of isobutane to the equivalent olefin is employed. The HF catalyst contains no $BF_3$. The temperature of the reactor contents is about 100° F.

The now preferred insoparaffin is isobutane. It may contain some isopentane. Also isopentane alone or containing some isobutane can be used.

The usual inerts such as ethane, propane, normal butane and the like can be present.

The hydrofluoric acid catalyst now preferred will contain little or no water. Although it appears that acceptable results can be obtained with water contents of up to about 10 or so weight percent, preferably the amount of water will be less than about 3 weight percent and still more preferably less than about 1 weight percent. Good results as indicated by the data have been obtained with water contents which are less than of the order of about 1 to 1.5 percent.

The acid soluble oils in the catalyst will preferably be as low as practicable. Good results have been obtained with acid soluble oil contents of from less than a few hundredths weight percent up to several percent. Preferably, the acid soluble oil content will not exceed about 5 weight percent. Ordinarily, there will be some alkyl fluoride formed in the catalyst.

The hydrogen fluoride acid catalyst will be 80 to substantially 100 weight percent and preferably about 90 weight percent HF.

As noted earlier, boron trifluoride will be preferably zero. Ordinarily not more than about 0.05 to 0.3 weight percent of boron trifluoride should be present for optimum results. To minimize the production of ethyl fluoride, no $BF_3$ or extremely small proportions of $BF_3$ should be present. As noted earlier, the amount of $BF_3$ present can and should be correlated with the ratio of the isoparaffin to olefin in the reactor feed.

Although the operating conditions of temperature, pressure, time ratios, etc., can be widely varied, the following are now given by way of further illustrating the invention in what is now its preferred form with respect to said conditions.

The temperature in the reaction zone can be in the broad range of from about 20° to about 150° F., preferably it will be in the range of from about 40° to 100° F. and still more preferably it will be below about 75° to about 90° F.

One skilled in the art will understand that below about 90° F. may require use of other than ordinary plant cooling water and this will, of course, be, relatively speaking, expensive.

The operation usually will be conducted under a pressure which maintains essentially substantially all of the reactants in liquid phase. At temperatures of the order of about 50°–175° F., usually 75° to about 130° F., a pressure of the order of about 160 to about 250, usually 175 to about 200 pounds per square inch guage will suitably maintain liquid phase operation.

The residence time usually will range from about 10 to about 240 seconds and preferably will be of the order of about 10 to about 200 or somewhat more seconds, more preferably the time hydrocarbon is in contact with the catalyst will range from about 20 to about 170 seconds. Residence time or contact time between the hydrocarbons and the HF catalyst can be determined (and adjusted) for static and mobile catalysts as follows: (a) static body of liquid catalyst; the hydrocarbon is dispersed into a perdetermined volume of liquid catalyst, the hydrocarbon being added at a preselected constant rate.

After the level of the catalyst plus hydrocarbon hold up therein has stabilized, there now being a body of hydrocarbon above the interface level, this resulting volume of the catalyst is determined. Then the hydrocarbon flow is stopped and a resulting lower level of catalyst phase results. The volume of this catalyst phases divided by the rate of hydrocarbon flow used gives the residence or contact time; (b) mobile catalyst; the velocity of the catalyst plus hydrocarbon (emulsion) in the reactor is determined; the length of travel between initial catalyst-hydrocarbon contact and phase separation of the hydrocarbon and catalyst is measured. This length is divided by the velocity gives contact or residence time.

The catalyst to total hydrocarbon ratio usually will be from about 0.5:1 up to about 10:1, preferably 2:1 to 6:1 approximately.

As noted, the weight percent of olefins higher than ethylene in the total olefin present in the reaction zone will be in the approximate range of from about 5 to about 70. When deciding on the ratio of higher olefin to ethylene, it will be helpful to consider the data given herein. Also, mere routine testing can be employed to determine the ratio ultimately to be employed.

Above about 60 weight percent higher olefin in the total olefin the Research Octane Number with no tetraethyl lead begins to drop off, and below about 5, the production of ethyl fluoride increases markedly.

Obviously, ethyl fluoride production should be minimized because of yield, spearation and recycle or reprocessing problems and attendant costs.

The data of Example I were obtained employing a process for engendering the reaction as described and claimed in U.S. Pat. No. 3,435,092, issued Mar. 25, 1969, Thomas Hutson, Jr., and Cecil O. Carter. As noted, the runs reported were made with roughly one third ethylene and roughly two thirds propylene and vice versa. In that process an olefin and an alkylatable material are alkylated in the presence of a catalyst in a manner which comprises maintaining a mass of the catalyst in liquid state in a reaction zone, passing a liquid mixture of the alkylatable hydrocarbon and the olefin into said mass of catalyst from an injection means or nozzle, the pressure drop across the nozzle being within the approximate range of from about 15 to 150 pounds per square inch gauge so as to obtain a fine dispersion of droplets of the mixture in the catalyst, the droplets having a diameter within the approximate range of 10 to 100 microns, the pressure being sufficient to maintain the mixture in essentially liquid state while maintaining a temperature within the range of approximately 40° to 150° F. The disclosure of the said patent is incorporated herein by reference.

EXAMPLE I

ETHYLENE-PROPYLENE DATA

| | X | Y |
|---|---|---|
| Olefins, weight percent, | | |
| Ethylene | 37 | 69 |
| Propylene | 63 | 31 |
| Temperature of Reactor, °F., | 100 | 69 |
| Reactor Pressure, Psig., | 190 | 190 |
| Reaction Time, sec., | 46 | 40 |
| iC$_4$/total olefin, mol ratio | 12.1/1 | 18.3/1 |
| Feed Nozzle Δ P, psi | 35 | 35 |
| HF Catalyst, wt. % | 0 | 0 |
| BF$_3$ | 0.6 | 0.7 |
| H$_2$O | 0.6 | 0.7 |
| Total Acidity | 87.8 | 89.9 |
| ASO | 0 | 0.13 |
| Catalyst/Hydrocarbon, vol ratio | 4/1 | 4/1 |
| Ethylene Conversion, wt. % | 99.4 | 98.9 |
| Ethylene to C$_2$H$_5$F, wt. % | 52.7 | 30.6 |
| # Alky/ # Olefin* | 2.49 | 2.64 |
| RON, Clear (debutanized alkylate) | 97.2 | 97.1 |
| MON, Clear (debutanized alkylate) | 92.5 | 92.1 |

*(Ethyl fluoride recycled to extinction)

The data in following example includes a number of runs according to the invention, and others not according to the invention for comparison purposes. The data were also obtained employing a process as described and claimed in U.S. Pat. No. 3,435,092, issued Mar. 2-5, 1969, Thomas Hutson, Jr. and Cecil O. Carter.

and the advantageous character of having present a higher olefin in the system as described.

A careful comparison of the runs in the example above given, including Run G, which merely illustrates a conventional hydrofluoric acid alkylation using isobutylene as the only olefin charged, will show the in-

EXAMPLE II.—ETHYLENE-BUTYLENES DATA

|  | A | B | C | D | E | F | G | H |
|---|---|---|---|---|---|---|---|---|
| Ethylene, wt. percent | 51.2 | 47.4 | 100 | 100 | 67 | 77.8 | 0 | 42.6 |
| Isobutylene, wt. percent | 48.8 | 52.6 |  |  | 33 |  | 100 | 57.4 |
| Butene-2, wt. percent |  |  |  |  |  | 22.2 |  |  |
| Total | 100.0 | 100.0 | 100 | 100 | 100 | 100.0 | 100 | 100.0 |
| Temperature, °F | 75 | 129 | 75 | 71 | 69 | 72 | 90 | 130 |
| Pressure, p.s.i.g | 190 | 190 | 190 | 190 | 190 | 190 | 180 | 190 |
| Residence time, sec | 103 | 140 | 103 | 32 | 166 | 110 | 29 | 95 |
| $iC_4$/olefin mol ratio | 6.9 | 7.2 | 6.9 | 9.7 | 6.0 | 6.3 | 6.5 | 7.3 |
| Feed nozzle $\Delta P$, p.s.i | 130 | 100 | 130 | 80 | 35 | 35 | 116 | 120 |
| HF catalyst (wt percent): |  |  |  |  |  |  |  |  |
| $BF_3$ | 0 | 0 | 0 | 0.10 | 0 | 0 | 0 | 0.6 |
| $H_2O$ | 0.3 | 0.6 | 0.3 | 0.44 | 0.96 | 1.3 | 1.9 | 0.8 |
| Total acidity | 89.6 | 86.7 | 89.6 | 80.0 | 85.9 | 84.9 | 90.1 | 93.2 |
| Acid sol. oil | 0.02 | 0.1 | 0.02 | 0.06 | 0.22 | 0.06 | 2.0 | 0.1 |
| HF catalyst to hydrocarbon vol. ratio | 4 | 4 | 4 | 4 | 4 | 4 | 4 | 4 |
| (a) Ethylene conversion | 97.6 | 99.5 | Trace | 57.5 | 97.2 | 93.2 |  | 100 |
| (b) Ethylene to ethyl fluoride | 0 | 0 | Trace | 42.5 | 22.1 | 6.5 |  | 6.3 |
| (c) Alkylate, lb./lb. olefin | 2.40 | 2.41 | 0 | 2.93 | 2.47 | 2.64 | 2.1 | 3.56 |
| (d) RON, clear | 100.0 | 92.4 |  | 90.9 | 99.5 | 91.6 | 94.0 | 84.6 |

*a.* Ethylene conversion is weight percent of ethylene feed. *b.* Weight percent of ethylene converted which became ethyl fluoride. *c.* The ultimate yields were calculated by the carbon-hydrogen method, that is, ultimate yeild equals alkylate molecular weight divided by the term alkylate molecular weight minus isobutane molecular weight. All yield data herein are calculated on this same basis. Ultimate yield includes recycle of ethyl fluoride (to extinction) to alkylate product. *d.* Research Octane Number with no tetraethyl lead.

In the foregoing example, Runs A, B, E, F and H represent runs according to the invention. It should be noted that in Runs A and B which used approximately 50 weight percent of each of the olefins, ethylene and isobutylene, almost all of the ethylene was converted to alkylate and no ethylene was converted to ethyl fluoride.

Run A yielded a 100.0 octane (Research Octane with no TEL added). The HF catalyst contained no $BF_3$. 97.6 percent of the ethylene was converted to alkylate. The reaction was carried out at 75° F.

In Run B, 92.4 octane, clear was obtained, no ethyl fluoride was present in the alkylate and 99.5 percent of the ethylene was converted to alkylate. The reaction was carried out at 129° F.

Similar analyses can be made by viewing the data in the table for Runs E, F AND H.

Run C, a run which is not according to the present invention, was made using only ethylene as the olefin and HF as the catalyst. No $BF_3$ was present. No alkylate was produced. A trace of ethyl fluoride was observed.

In Run D, also not according to the invention, there was added 0.1 weight percent of $BF_3$ to the HF catalyst to cause reaction of 100 percent ethylene feed. 42.5 percent of the ethylene converted resulted in ethyl fluoride. Only 57.5 percent of the ethylene was converted. The octane was 90.9 clear.

The data, as these may be viewed in the light of the analysis made thereof herein, demonstrate the need vention in the light of data showing that HF as catalyst alone or with only 0.1 part of the $BF_3$ with ethylene as the sole olefin does not yield sufficiently high octane and requires considerable recycle of ethyl fluoride. Thus, Run C made no alkylate and Run D made alkylate of low octane and high ethyl flouride yield per pass, which as not practical for any commercial operation. Thus Run D made octane of 90.9 RON clear with high ethyl fluoride production, whereas a run like Run A made 2.40 pounds alkylate per pound of olefin, and the RON clear octane was 100.0, with zero production of ethyl fluoride per pass.

Presently, those conditions, proportions, etc., are preferred with which zero or only a small amount of ethyl fluoride is in the alkylate. More preferably for the reasons given herein, those conditions, etc., are preferred which yield zero ethyl fluoride.

Although zero ethyl fluoride is indicated in Runs A and B above, it is possible that some small amount of ethyl fluoride may have been produced but dissolved in the HF acid.

It has also been discovered, when isoparaffin (isobutane) is alkylated with ethylene and higher olefin combined, using HF catalyst, that when operating in the lower portion of the range of mol ratio of isobutane to total olefin, that is at less than about 4 to 1 mol ratio, in the range of about 1.5 to 1 to about 4 to 1, that when some appreciable amount of $BF_3$ is present in the HF catalyst, high quality alkylate in practical quantities is produced or economically commerically feasible. The use of the $BF_3$ as herein described and as shown by the data results in a minimized production of ethyl fluoride. About 0.3 to 0.4 weight percent $BF_3$ up to about 4 weight percent $BF_3$, based on total HF catalyst, is required in the operation when the isoparaffin, e.g., isobutane to total olefin mol ratio is below about 4 to 1.

The data in Example III, below, demonstrates the above.

EXAMPLE III.—ETHYLENE-ISOBUTYLENE DATA

| Run | J | K | L | M | N | O | P |
|---|---|---|---|---|---|---|---|
| $C_2$=wt. percent | 76.2 | 81.6 | 82.4 | 73.1 | 83.2 | 95.1 | 90.9 |
| $iC_4$=wt. percent | 23.8 | 18.4 | 17.6 | 26.9 | 16.8 | 4.9 | 9.1 |
| Temp. °F | 73 | 99 | 101 | 70 | 100 | 70 | 77 |
| Pres. p.s.i.g | 190 | 190 | 190 | 190 | 190 | 190 | 190 |
| React. time, sec | 40 | 60 | 60 | 100 | 57 | 34 | 86 |
| $iC_4$/olefin (mol) | 2.1/1 | 2.1/1 | 2.2/1 | 6.4/1 | 3.8/1 | 8.4/1 | 9.5/1 |
| Feed nozzle ΔP, p.s.i | 20 | 25 | 30 | 35 | 25 | 145 | 200 |
| HF catalyst (wt. percent): | | | | | | | |
| $BF_3$ | 1.7 | 0.97 | 0 | 0 | 0.77 | 0 | 0.6 |
| $H_2O$ | 0.6 | 0.3 | 0.6 | 0.6 | 0.2 | 0.4 | 0.4 |
| Total acidity | 82 | 66 | 73 | 85.5 | 72 | 79 | 92 |
| ASO | 0.1 | 0.1 | 0.1 | 0.02 | 0 | 0.1 | 0.16 |
| CAT/HC vol. ratio | 4/1 | 4/1 | 4/1 | 4/1 | 4/1 | 4/1 | 4/1 |
| (a) $C_2$=conv. wt. percent | 96.5 | 96.3 | 57.6 | 98.2 | 96.5 | 87.4 | 100 |
| (b) $C_2$= to $C_2H_5F$ | 11 | 20 | 43 | 16.5 | 39 | 56 | 14.6 |
| (c) Alkylate, lb./lb. olefin | 2.35 | 2.65 | 2.52 | 2.58 | 2.65 | 2.87 | 3.25 |
| (d) RON, clear | 98.5 | 97.6 | 95.0 | 100.7 | 98.5 | 99.6 | 84.7 |
| Motor, clear | 93.9 | 91.2 | 90.0 | 94.0 | 92.2 | 91.7 | 82.8 |

NOTE.—See Example II, footnotes (a), (b), (c), and (d).

In Example III, Run N used a 3.8/1 ratio and used $BF_3$. Run L used a 2.2/1 ratio and no $BF_3$. Run N had high ethylene conversion at 96.5 but the ethyl fluoride selectivity was 39. The octane was excellent at 98.5. Run N has to recycle ethyl fluoride and a small amount of ethylene. The yeild is 2.65 pounds of alkylate per pound of olefin converted to alkylate (as by recycle in a plant operation). Run L has both low conversion and high ethyl fluoride selectivity; that is, both unreacted ethylene and ethyl fluoride are large. Run L has low octane at 95.0 and about the same yield at 2.52.

Run K at 2.1/1 ratio and uses $BF_3$. Ethylene conversion is high at 96.3 and fluoride selectivity is lower at 20, meaning a smaller recycle in the plant. The octane is high at 97.6 and the yield good at 2.65 pounds of alkylate per pound of olefin converted to alkylate (small recycle can be used here).

Comparing Runs O and P, without and with $BF_3$, respectively, and with high $iC_4$/olefin ratios of 8.4/1 and 9.5/1, respectively, it is noted that the $BF_3$ used in Run P damages octane at 84.7 (much isopentane made from the isobutane) and much alkylate. Conversion was 100 and ethyl fluoride selectivity low at 14.6, meaning not much recycle would be needed. But the alkylate octane is not acceptable. Run O, without $BF_3$, made high octane at 99.6, but had high ethyl fluoride selectivity meaning large recycle in the plant. Yield was good at 2.87.

Run M at 6.4/1 ratio and no $BF_3$ gave excellent octane at 100.7, high conversion of 98.2, and relatively low ethyl fluoride, and a good yield.

It will be understood by one skilled in the art in possession of this disclosure having studied the same that the inventions herein described are not limited to any particular form of manner of bringing about the intimate contact of the reactant in the reaction zone. It will be sufficient to note that intimate contact is required to bring the olefin and the isoparaffin into the relationship with each other in which the advantages of the invention can be obtained. An excellent system for the operation of our invention can be the apparatus detailed in U. S. Pat. Nos. 3,213,157, issued Oct. 19, 1965, to Hays et al, and/or 3,281,213, issued Oct. 25, 1966, to Waddill, wherein the pressure change takes place rather suddenly at the moment when the hydrocarbon reactants are being emitted from each nozzle orifice and contact the catalyst to effect alkylation.

Reasonable variation and modification are possible within the scope of the foregoing disclosure, drawing and appended claims to the invention, the essence of which is that there have been provided a process for the alkylation of an isoparaffin with ethylene, e.g., isobutane and/or isopentane with ethylene in the presence of a higher olefin, e.g., propylene, a butylene, an amylene, etc., in the presence of a hydrogen fluoride catalyst in which there is contained zero or some $BF_3$ depending upon the molar ratio of isoparaffin to total olefin as herein described and more particularly a process for such an alkylation wherein the molar ratio of isoparaffin to total olefin is from about 1.5/1 to about 4/1 and $BF_3$ is present, as described, and a process in which the molar ratio of isoparaffin to total olefin is at least about 4/1 or higher and there is present in the catalyst no $BF_3$, thus, to obtain with the processes described good yields of high octane alkylate suitable for use for lead-free fuels.

We claim:

1. A process for the alkylation of at least one isoparaffin with ethylene which comprises conducting the alkylation with intimate admixture of the reactants and a catalyst consisting essentially of hydrogen fluoride in the presence of a substantial amount of a higher olefin, wherein the higher olefin is present in an amount of from about 5 to about 70 weight percent of the total olefin used and wherein the temperature is in the approximate range of from about 75° to about 150° F.; the pressure is sufficient to maintain a substantial part of the hydrocarbon in liquid phase; wherein the residence time is in the approximate range of 10 and 240 seconds; and wherein the mol ratio of isoparaffin to total olefin is in the approximate range of 4:1 to 25:1.

2. An alkylation of an isoparaffin with ethylene in the presence of a higher olefin in the presence of an HF catalyst which contains zero to about 4 weight percent $BF_3$ based on the HF content of the catalyst being employed, wherein the mol ratio of isoparaffin to total olefin is in the approximate range of from about 1.5 to 1 to about 25 to 1, the weight percent of higher olefin in the total olefin is above about 5 and not in excess of about 70; the residence time is in the approximate range of 10– 240 seconds and the temperature is in the approximate range of 75° –150° F.

3. An alkylation according to claim 1 wherein the higher olefin is present in an amount of from about 10 to about 55 weight percent and the mol ratio of isoparaffin to total olefin is at least about 6:1.

4. An alkylation according to claim 1 wherein the higher olefin is present in an amount of from about 5 to about 60 weight percent and the mol ratio of isoparaffin to total olefin is in the approximate range 6:1 – 25:1.

5. An alkylation according to claim 2 wherein the isoparaffin to total olefin mol ratio is at least about 4:1, and the $BF_3$ is present in an amount in the approximate range of from zero to about 0.3 weight percent of the catalyst.

6. An alkylation according to claim 2 wherein the isoparaffin to total olefin mol ratio will be in the approximate range of from about 1.5:1 to about 4:1 and the $BF_3$ will be present in an amount of about 0.3 up to about 4 percent by weight of the catalyst.

7. An alkylation according to claim 5 wherein the isoparaffin to olefin ratio is at least about 6:1 and $BF_3$ is substantially zero in the catalyst.

8. An alkylation according to claim 6 wherein the isoparaffin to olefin ratio is at least about 2:1 and the $BF_3$ is in the approximate range of from about 2 to about 4 weight percent of the catalyst.

9. An alkylation according to claim 1 wherein the isoparaffin is at least one selected from isobutane and isopentane and in addition to the ethylene there is present as said higher olefin at least one of propylene and a butylene.

10. An alkylation according to claim 9 wherein the isoparaffin is isobutane and the butylene is isobutylene.

11. An alkylation according to claim 1 wherein the total hydrocarbon to total catalyst volume ratio is in the approximate range of from about 0.1 2 to 1.

12. An alkylation according to claim 9 wherein the isoparaffin is isobutane and said higher olefin is propylene.

* * * * *

UNITED STATES PATENT OFFICE

CERTIFICATE OF CORRECTION

Patent No. 3,761,540　　　　　　　　　　Dated: September 25,

It is certified that error appears in the above-identified patent and that said Letters Patent are hereby corrected as shown below:

Column 10, line 47, "10 and 240" should --- 10 to 240 ---.

Column 12, line 12, "0.1 2 to 1" should be --- 0.1-2 to 1 ---

Signed and sealed this 18th day of February 1975.

(SEAL)
Attest:

RUTH C. MASON
Attesting Officer

C. MARSHALL DANN
Commissioner of Patents
and Trademarks